United States Patent
Selway

(10) Patent No.: US 9,521,435 B2
(45) Date of Patent: Dec. 13, 2016

(54) PROCESSING CONTENT STREAMS THAT INCLUDE ADDITIONAL CONTENT SEGMENTS ADDED IN RESPONSE TO DETECTION OF INSERTION MESSAGES

(75) Inventor: Hugh A. Selway, Cheyenne, WY (US)

(73) Assignee: EchoStar Technologies L.L.C., Englewood, CO (US)

( * ) Notice: Subject to any disclaimer, the term of this patent is extended or adjusted under 35 U.S.C. 154(b) by 1004 days.

(21) Appl. No.: 13/324,889

(22) Filed: Dec. 13, 2011

(65) Prior Publication Data
US 2013/0151634 A1    Jun. 13, 2013

(51) Int. Cl.
| | |
|---|---|
| *G06F 15/16* | (2006.01) |
| *H04N 21/233* | (2011.01) |
| *H04N 21/858* | (2011.01) |
| *H04N 21/234* | (2011.01) |
| *H04N 21/2343* | (2011.01) |
| *H04N 21/633* | (2011.01) |
| *H04N 21/81* | (2011.01) |

(52) U.S. Cl.
CPC ...... *H04N 21/2335* (2013.01); *H04N 21/2343* (2013.01); *H04N 21/23424* (2013.01); *H04N 21/633* (2013.01); *H04N 21/812* (2013.01); *H04N 21/858* (2013.01)

(58) Field of Classification Search
CPC ............ H04N 21/234; H04N 21/812; H04N 21/23424
USPC ........................................ 709/206, 231, 224
See application file for complete search history.

(56) References Cited

U.S. PATENT DOCUMENTS

| | | | |
|---|---|---|---|
| 7,039,933 B1 | 5/2006 | Chen et al. | |
| 8,763,029 B1* | 6/2014 | Haberman et al. | 725/32 |
| 2002/0073084 A1* | 6/2002 | Kauffman et al. | 707/10 |
| 2004/0010807 A1* | 1/2004 | Urdang et al. | 725/136 |
| 2005/0273321 A1* | 12/2005 | Choi | 704/207 |

(Continued)

FOREIGN PATENT DOCUMENTS

| | | |
|---|---|---|
| EP | 1 499 113 A2 | 1/2005 |
| EP | 2 061 239 A2 | 5/2009 |

(Continued)

OTHER PUBLICATIONS

Extended European Search Report for EP 12196891 dated Dec. 18, 2013, 6 pages.

*Primary Examiner* — El Hadji Sall
(74) *Attorney, Agent, or Firm* — Kilpatrick Townsend & Stockton

(57) ABSTRACT

A reader device monitors a content stream which includes a source stream that is received from a content source and modified by adding an additional content segment in response to detection of an insertion message. The reader detects an insertion message and signals a stream processing device. In response, the processing device performs an operation on the portion of the content stream that includes the additional content segment corresponding to the detected insertion message, which may include omitting performance of an operation that would have otherwise been performed. In some implementations, the reader and the processing device may be separate while in other implementations the reader may be integrated into the processing device. In various implementations, the reader and the processing device may be connected via one or more contact closures and the reader may signal the processing device by activating the contact closure.

21 Claims, 7 Drawing Sheets

(56) References Cited

U.S. PATENT DOCUMENTS

| | | | |
|---|---|---|---|
| 2007/0055983 A1* | 3/2007 | Schiller et al. | 725/32 |
| 2007/0055984 A1 | 3/2007 | Schiller et al. | |
| 2007/0143491 A1* | 6/2007 | Velrajan et al. | 709/231 |
| 2007/0204310 A1* | 8/2007 | Hua et al. | 725/88 |
| 2008/0101456 A1* | 5/2008 | Ridge et al. | 375/240.01 |
| 2009/0119702 A1* | 5/2009 | Jagannathan et al. | 725/32 |
| 2009/0150207 A1* | 6/2009 | Feng et al. | 705/8 |
| 2009/0217316 A1* | 8/2009 | Gupta | 725/32 |
| 2009/0217318 A1* | 8/2009 | VerSteeg et al. | 725/32 |
| 2009/0222853 A1* | 9/2009 | White et al. | 725/34 |
| 2010/0162289 A1* | 6/2010 | Sanders | H04N 21/4758 725/23 |
| 2010/0169932 A1* | 7/2010 | Grubb | H04N 7/165 725/61 |
| 2010/0269132 A1* | 10/2010 | Foti | 725/32 |
| 2012/0198492 A1* | 8/2012 | Dhruv et al. | 725/32 |
| 2013/0007815 A1* | 1/2013 | Jackson et al. | 725/63 |
| 2013/0173394 A1* | 7/2013 | Birch | 705/14.66 |

FOREIGN PATENT DOCUMENTS

| | | |
|---|---|---|
| EP | 2605538 A2 | 6/2013 |
| WO | 99/30493 A1 | 6/1999 |

* cited by examiner

PROCESSING CONTENT STREAMS THAT INCLUDE ADDITIONAL CONTENT SEGMENTS ADDED IN RESPONSE TO DETECTION OF INSERTION MESSAGES

FIELD OF THE INVENTION

This disclosure relates generally to content streams, and more specifically to processing portions of content streams that include additional content segments based on detection of insertion messages that caused the additional content segments to be added to the portions of the content streams.

SUMMARY

The present disclosure discloses systems and methods for processing content streams that include additional content segments added in response to detection of insertion messages. A reader device may monitor one or more content streams which include one or more source streams that are received from one or more content sources and modified by adding one or more additional content segments in response to detection of one or more insertion messages. The reader device may detect an insertion message included in the content stream. In response to such detection, the reader device may signal one or more stream processing devices to indicate the presence of a corresponding additional content segment that has been added to the content stream.

In response to receiving the signal, the stream processing device may perform one or more operations on the portion of the content stream that includes the additional content segment corresponding to the detected insertion message. In various implementations, such operations may include inserting one or more interactive triggers (i.e., one or more interactive application programs such as one or more pop-up menus that may be automatically executed when content containing such interactive triggers is displayed), configuring the additional content segments to perform one or more video effects such as a squeeze back, and/or performing one or more audio processing operations (such as one or more kinds of audio compression to correct audio quality of the additional content segment, reduce audio levels of the additional content segment, and/or otherwise alter audio elements of the additional content segment). In some implementations, such operations may even include omitting of one or more operations the stream processing device may otherwise have performed on the content stream absent the received signal.

In some cases, the content stream may be transmitted from the stream processing device to one or more content receivers via one or more transmission systems. Although the reader device and stream processing device are discussed and illustrated as separate devices, in various implementations the reader device may be integrated into the stream processing device. In one or more implementations, the reader device and the stream processing device may be connected via one or more contact closures and the reader device may signal the stream processing device by activating the contact closure.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
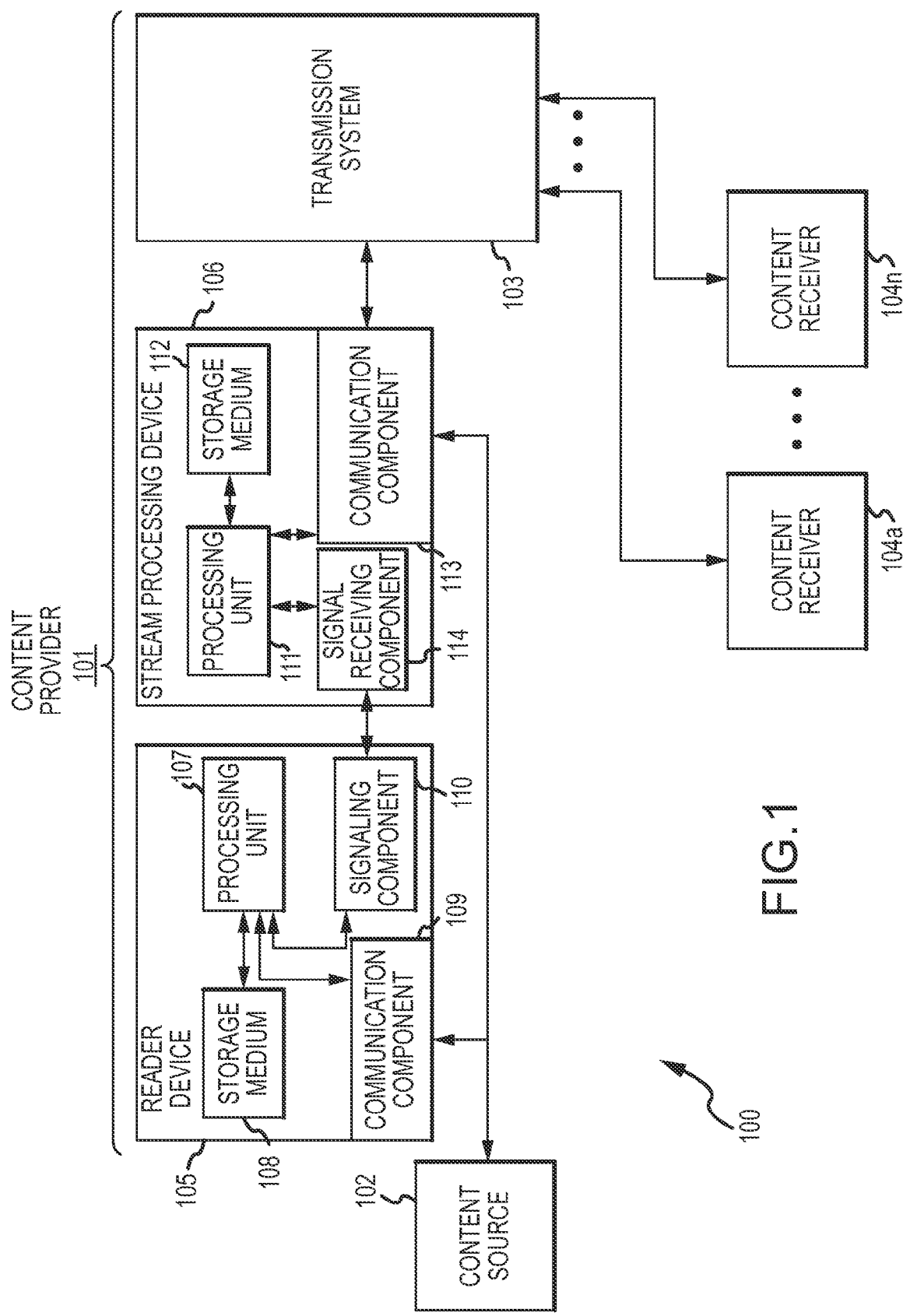
FIG. 1 is a block diagram illustrating a system for processing content streams that include additional content segments added in response to detection of insertion messages.

The description that follows includes sample systems, methods, and computer program products that embody various elements of the present disclosure. However, it should be understood that the described disclosure may be practiced in a variety of forms in addition to those described herein.

Content providers (such as satellite and/or cable television providers, digital music providers, Internet service providers, cellular service providers, on-demand movie providers, pay-per-view movie providers and other such content providers) may receive one or more source streams from one or more sources. The content provider may perform one or more processing operations on the source stream to generate a content stream (which may include multiplexing the source stream with one or more other streams of content, scrambling and/or encrypting the multiplexed content, and so on). The content provider may transmit the content stream to one or more content receivers (such as one or more television receivers, television tuners, set top boxes, desktop computers, laptop computers, mobile computing devices, tablet computers, cellular telephones, smart phones, digital music receivers, and/or other such content receivers) via one or more transmission systems (such as one or more satellite transmission systems, coaxial cable transmission systems, cellular transmission systems, Internet transmissions systems, and/or other such transmission systems).

As part of processing the source stream, the content provider may add one or more additional content segments into the source stream in portions of the source stream in response to detection of one or more insertion messages included in the source stream. Such insertion messages may include one or more SCTE (Society of Cable Telecommunications Engineers) 104 messages, SCTE 35 messages, or SCTE 30 messages. For example, such additional content segments may include one or more commercials. In some cases, the source stream may already include one or more commercials when received from the content source. However, the source stream may include the one or more insertion messages in order to allow the content provider to add one or more additional commercials to the source stream.

In some cases, the content provider may wish to perform additional processing upon the additional content segments after they have been included in the content stream. Such additional processing may include configuring the additional content segments to perform one or more video effects (such as a squeeze back where the additional content segment is configured to be reduced in size when displayed so that a portion of the original source stream that corresponds to where the additional content segment is inserted is still displayed), one or more audio processing operations (such as one or more kinds of audio compression to correct audio quality of the additional content segment, reduce audio levels of the additional content segment, and/or otherwise alter audio elements of the additional content segment), insert one or more interactive triggers that may execute one or more interactive applications (such as one or more pop-up menus) when the content stream is displayed, and/or other such operations to configure the additional content segment. However, processing such additional content segments after such segments are added to the source stream without affecting other portions of the stream may be difficult and/or complex. Processing such additional content segments prior to adding them to the source stream may not be possible in all cases as some processing of this kind may involve processing the combination of the additional content segment and the portion of the source stream to which the additional content segment has been added.

Further, in other cases the content provider may wish to omit performance of various processing operations on portions of the content stream where additional content segments have been added that the content provider may otherwise have performed on portions of the content stream where additional content segments have not been added. For example, the content provider may periodically insert one or more interactive triggers in the content stream. However, insertion of such interactive triggers may disrupt such additional content segments and/or may overwrite data included in the content stream for such additional content segments (such as data included in a vertical blanking interval). As such, the content provider may wish to omit the periodically inserted interactive triggers for any portion of the content stream where such additional content segments have been added. However, signaling the one or more components that insert such interactive triggers as to which portions include additional content segments and which portions do not include such additional content segments may be difficult and/or complex.

The present disclosure discloses systems and methods for processing content streams that include additional content segments added in response to detection of insertion messages. A reader device may monitor one or more content streams. The content stream may include one or more source streams, received from one or more content sources, modified by adding one or more additional content segments (such as one or more commercials) in response to detection of one or more insertion messages included in the source stream. The reader device may detect an insertion message included in the content stream and may signal one or more stream processing devices accordingly to indicate the presence of a corresponding additional content segment that has been added to the content stream. In response to receiving the signal, the stream processing device may perform one or more operations (which may include omission of one or more operations the stream processing device would have otherwise performed on the content stream) on the portion of the content stream that includes the additional content segment corresponding to the detected insertion message. In some cases, the content stream may be transmitted from the stream processing device to one or more content receivers via one or more transmission systems.

FIG. 1 is a block diagram illustrating a system 100 for processing content streams that include additional content segments added in response to detection of insertion messages. The system 100 may include one or more content providers 101, one or more content sources 102 (which may be a television programming source, a digital music source, a movie source, and/or any other content source from which the content provider receives content for further distribution), and/or one or more content receivers 104a-104n. The content provider may receive one or more source streams from the content source, process the source stream to generate one or more content streams (which may include multiplexing the source stream with one or more other streams of content, scrambling and/or encrypting the multiplexed content, and so on), and transmit the content stream to the content receivers. The content provider may be a satellite and/or cable television provider, a digital music provider, an Internet service provider, a cellular service provider, an on-demand movie provider, a pay-per-view movie provider, and/or any other such content provider. The content source may be any source that provides streams of content to the content provider which the content provider may then transmit to the content receivers. The content receivers may be one or more television receivers, television tuners, set top boxes, desktop computers, laptop computers, mobile computing devices, tablet computers, cellular telephones, smart phones, digital music receivers, and/or any other such content receivers.

The content provider 101 may receive one or more source streams from the content source 102. The source stream may include one or more insertion messages (such as one or more SCTE (Society of Cable Telecommunications Engineers) 104 messages, SCTE 35 messages, or SCTE 30 messages) indicating that the content provider may modify the source stream by adding one or more additional content segments (such as one or more commercials) to the source stream at one or more portions of the source stream indicated by the messages. Such insertion messages may specify a delay or other countdown to the start of the portion of the source stream where the additional content segment may be added, a duration of the portion of the source stream where the additional content segment may be added, and/or other such information regarding the portion of the source stream where the additional content segment may be added. The content provider may detect such insertion messages and generate a content stream by modifying the source stream such that the additional content segments are added to the source stream utilizing one or more components not illustrated.

After generating the content stream, the content provider 101 may monitor and/or further process the content stream utilizing the reader device 105 and/or the stream processing device 106. The content provider may also perform other operations such as multiplexing the content stream with one or more other streams of content, scrambling and/or encrypting the multiplexed content, and so on. The content provider may transmit the content stream to one or more content receivers 104a-104n (such as one or more television receivers, television tuners, set top boxes, desktop computers, laptop computers, mobile computing devices, tablet computers, cellular telephones, smart phones, digital music receivers, and/or other such content receivers) via one or more transmission systems 103 (such as one or more satellite transmission systems, coaxial cable transmission systems, cellular transmission systems, Internet transmissions systems, and/or other such transmission systems).

The stream processing device 106 may include one or more processing units 111, one or more non-transitory storage media 112 (which may take the form of, but is not limited to, a magnetic storage medium; optical storage medium; magneto-optical storage medium; read only memory; random access memory; erasable programmable memory; flash memory; and so on), one or more communication components 113, and/or one or more signal receiving components 114. The stream processing device may receive the content stream after addition of the one or more additional content segments utilizing the communication component 113. The processing unit 111 may execute instructions stored in the non-transitory storage medium 112 to perform one or more stream processing operations on the content stream and/or perform such operations upon receipt of one or more signals from the reader device 105 via the signal receiving component, which may include omission of an operation that the processing unit 111 may otherwise have performed.

In some cases, such stream processing operations may include inserting one or more interactive triggers, or interactive application programs (such as one or more pop-up menus) that may be automatically executed when content containing such interactive triggers is displayed. In other cases, such stream processing operations may include configuring the additional content segments to perform one or more video effects, such as a squeeze back where the additional content segment is configured to be reduced in size when displayed so that a portion of the original source stream that corresponds to where the additional content segment is inserted is still displayed. In still other cases, such stream processing operations may include one or more audio processing operations, such as one or more kinds of audio compression to correct audio quality of the additional content segment, reduce audio levels of the additional content segment, and/or otherwise alter audio elements of the additional content segment. In yet other cases, such stream processing operations may include omitting performance of various operations (such as those listed above) that would have otherwise been performed.

The reader device 105 may include one or more processing units 107, one or more non-transitory storage media 108, one or more communication components 109, and/or one or more signal receiving components 110. The reader device may receive the content stream after addition of the one or more additional content segments utilizing the communication component 109. The processing unit 107 may execute instructions stored in the non-transitory storage medium 108 to monitor the content stream and/or detect one or more insertion messages (such as one or more SCTE (Society of Cable Telecommunications Engineers) 104 messages, SCTE 35 messages, or SCTE 30 messages). Such insertion messages may correspond to one or more additional content segments that were added to the source stream in generating the content stream.

Upon detection of an insertion message, the reader device may signal the stream processing device 106 utilizing the signaling component 110. In one implementation, the signaling component 110 and the signal receiving component 114 may be components of a contact closure that connects the reader device 105 and the stream processing device. In such implementations, the reader device may signal the stream processing device upon detection of an insertion message by activating the contact closure. When the contact closure is activated, the stream processing device may perform one or more processing operations (which may include omission of performance of one or more operations that the stream processing device would otherwise have performed) in response to the signal that an insertion message has been detected. The stream processing device may then cease performing the one or more operations when the contact closure is no longer activated. However, though this implementation is described as utilizing a contact closure, other signaling components may be utilized without departing from the scope of the present disclosure. In various implementations other signaling components (such as messages transmitted via one or more network connections) may be utilized by the reader device to signal the stream processing device regarding detection of one or more insertion messages.

Although the system 100 is illustrated and described above as including particular components arranged in a particular configuration, other components may be utilized and may be configured in different arrangements without departing from the scope of the present disclosure. For example, though the reader device 105 and the stream processing device 106 are illustrated and described above as separate components, in various implementations the reader device may be incorporated into the stream processing device. In such implementations, the reader device may signal the stream processing device regarding detection of one or more insertion messages utilizing one or more signaling components internal to the stream processing device. Further, in various implementations, the content provider 101 may include one or more components not shown, such as one or more devices for generating the content stream by receiving the source stream from the content source 102 and adding additional content segments as specified by detected insertion messages, one or more devices for storing the content stream, one or more devices for multiplexing the content stream with one or more other content streams, one or more devices for scrambling and/or encrypting such multiplexed content streams, and so on.

Figure 2:
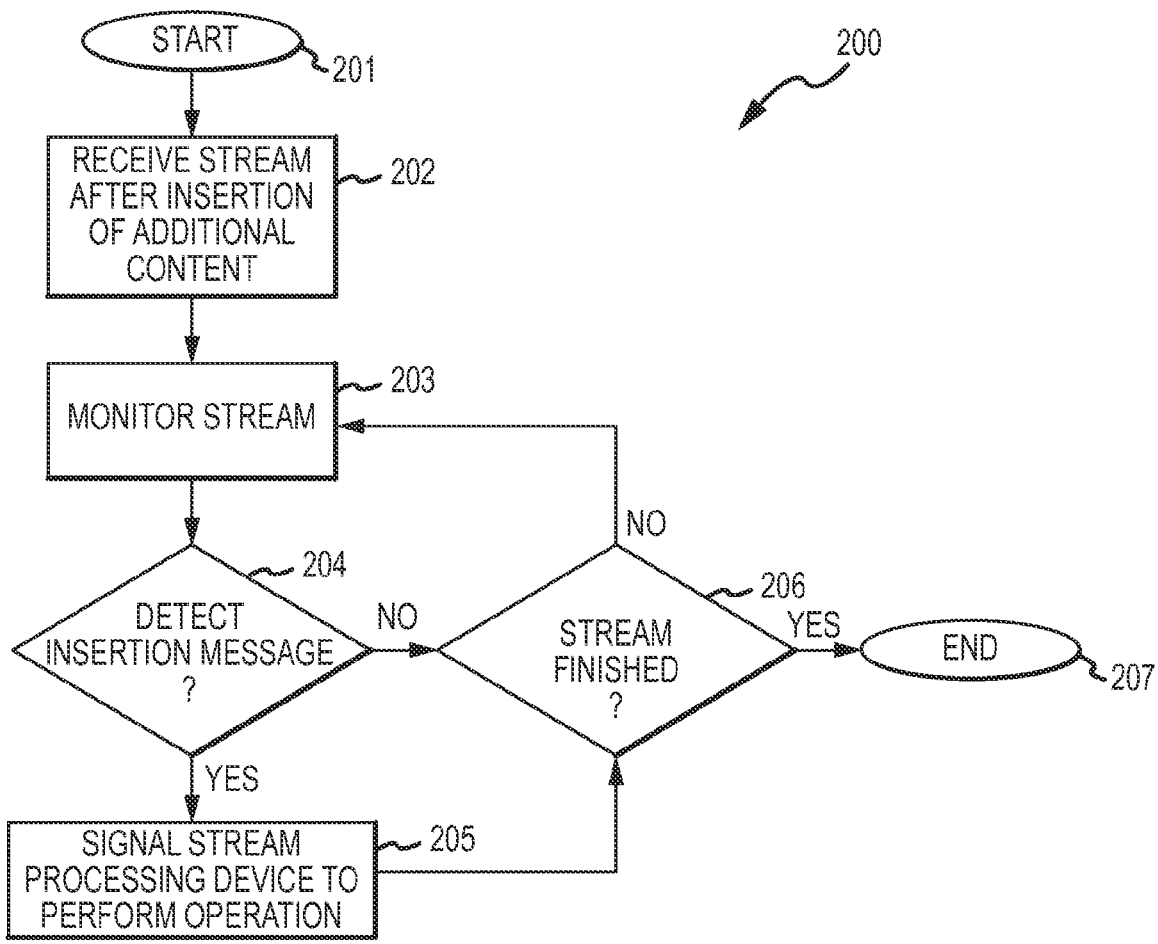
FIG. 2 is a flow chart illustrating a first example method for processing content streams that include additional content segments added in response to detection of insertion messages. This method may be performed by the reader device of FIG. 1.

FIG. 2 illustrates a first example method 200 for processing content streams that include additional content segments added in response to detection of insertion messages. The method 200 may be performed by the reader device 105 of FIG. 1. The flow begins at block 201 and proceeds to block 202 where the reader device receives a content stream utilizing the communication component 109 after insertion of one or more additional content segments. The flow then proceeds to block 203 where the processing unit 107 monitors the content stream. Next, the flow proceeds to block 204 where the processing unit 107 determines whether or not an insertion message is detected in the content stream. Such an insertion message may correspond to an additional content segment (such as a commercial) that has been added to a source stream in generating the content stream. If so, the flow proceeds to block 205. Otherwise, the flow proceeds to block 206.

At block 205, after the processing unit 107 determines that an insertion message is detected in the content stream, the processing unit 107 may signal the stream processing device 106 via the signaling component 110 to perform one or more operations that the stream processing device performs in response to detection of an insertion message. The flow then proceeds to block 206.

At block 206 the processing unit 108 determines whether or not the content stream is finished. If not, the flow returns to block 203 where the processing unit 107 continues to monitor the content stream. Otherwise, the flow proceeds to block 207 and ends.

Figure 3A:
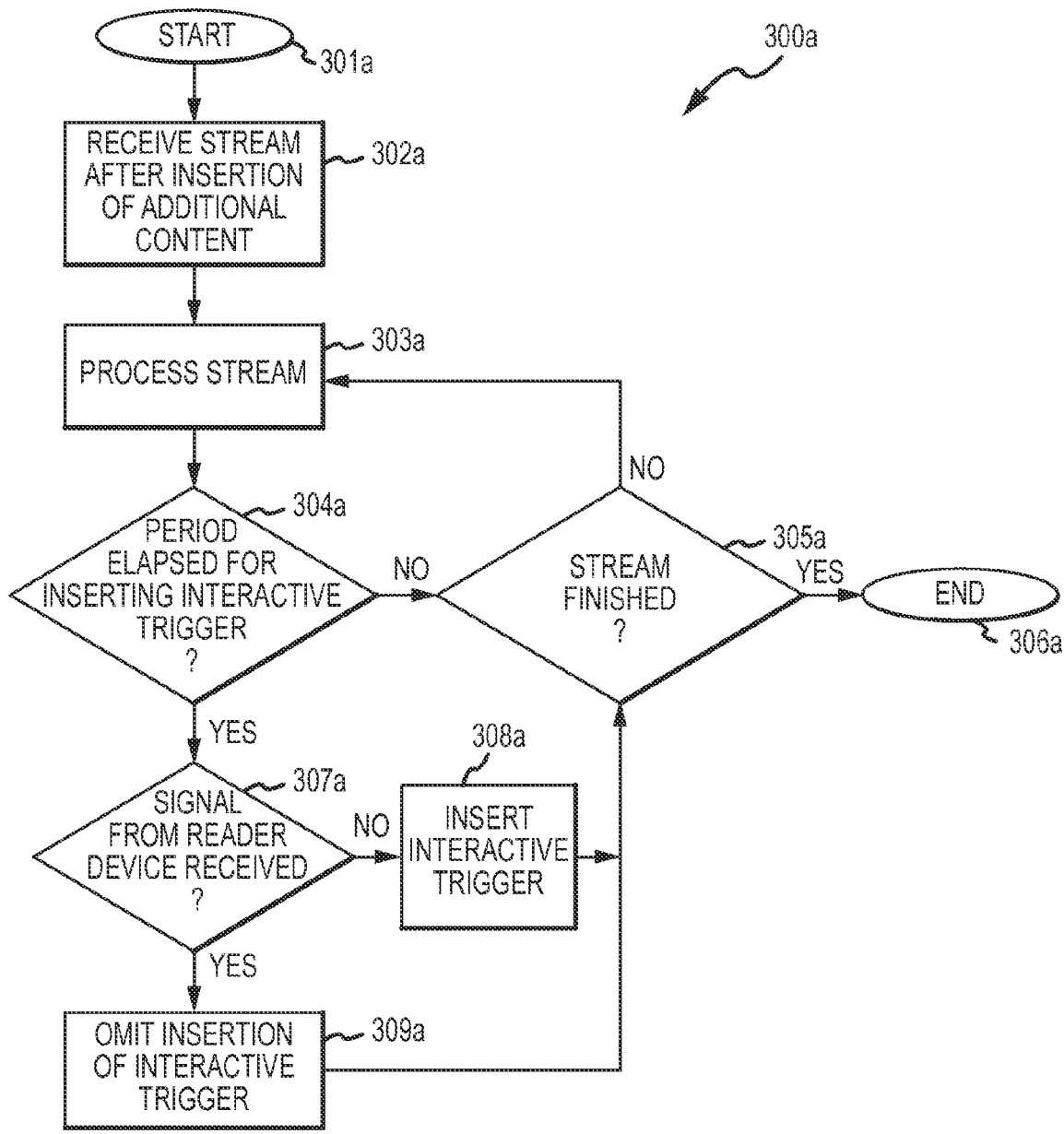
FIG. 3A is a flow chart illustrating a second example method for processing content streams that include additional content segments added in response to detection of insertion messages. This method may be performed by the stream processing device of FIG. 1.

FIG. 3A illustrates a second example method 300a for processing content streams that include additional content segments added in response to detection of insertion messages. The method 300a may be performed by the stream processing device 106 of FIG. 1. The flow begins at block 301 a and proceeds to block 302a where the stream processing device receives a content stream utilizing the communication component 113 after insertion of one or more additional content segments. The flow then proceeds to block 303a where the processing unit 111 processes the content stream and the flow proceeds to block 304a. At block 304a, the processing unit 111 determines whether or not a period has elapsed wherein the processing unit 111 inserts an interactive trigger each time the period elapsed. If so, the flow proceeds to block 307a. Otherwise, the flow proceeds to block 306a.

At block 306a, the processing unit 111 determines whether or not the content stream is finished. If not, the flow returns to block 303a where the processing unit 111 continues to process the content stream. Otherwise, the flow proceeds to block 307a and ends.

At block 307a, after the processing unit determines that the period has elapsed, the processing unit 111 determines whether or not a signal is received from the reader device 105 indicating detection of an insertion message. If not, the flow proceeds to block 308a where the processing unit 111 inserts the interactive trigger in the content stream before the flow proceeds to block 305a and the processing unit 111 determines whether or not the content stream is finished. Otherwise, the flow proceeds to block 309a where the processing unit 111 omits insertion of the interactive trigger in the content stream before the flow proceeds to block 305a and the processing unit 111 determines whether or not the content stream is finished.

Figure 3B:
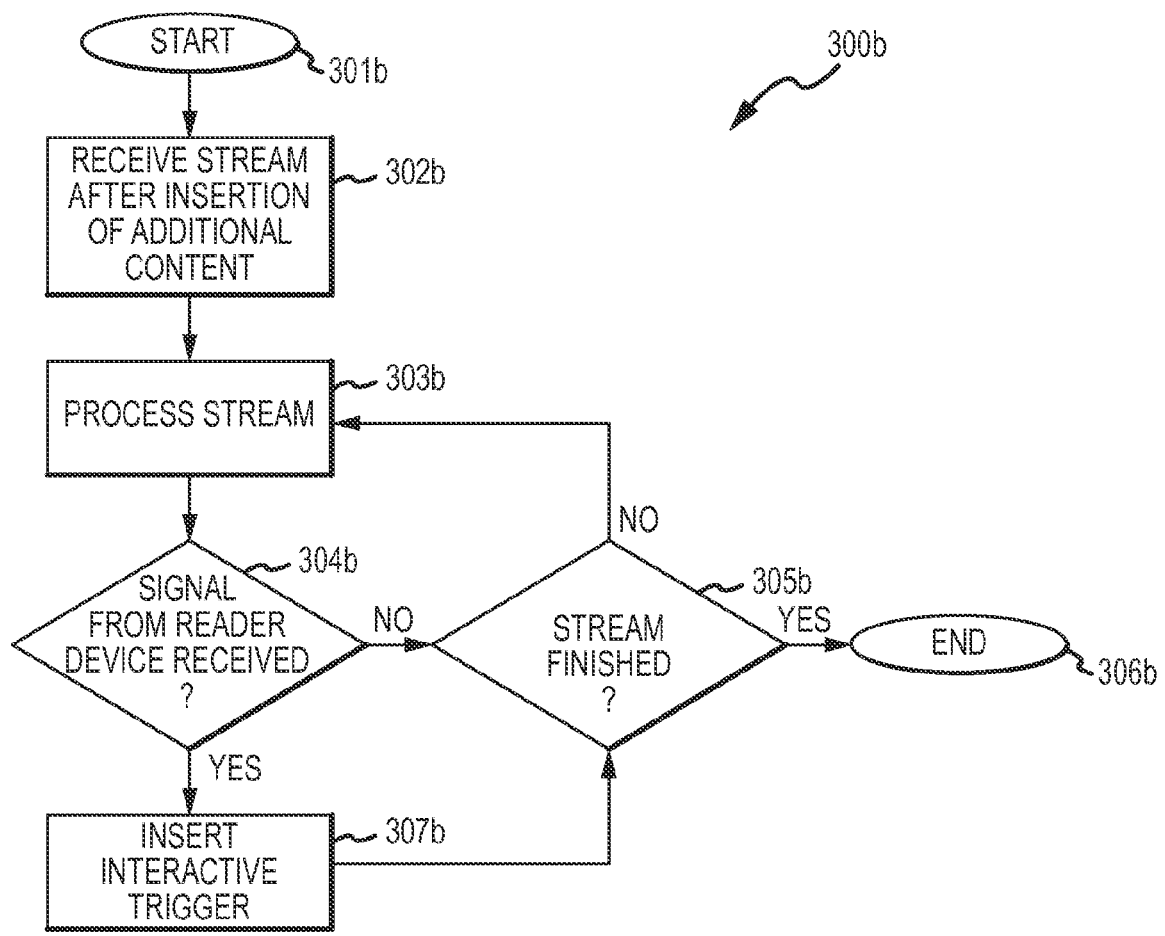
FIG. 3B is a flow chart illustrating a third example method for processing content streams that include additional content segments added in response to detection of insertion messages. This method may be performed by the stream processing device of FIG. 1.

FIG. 3B illustrates a third example method 300b for processing content streams that include additional content segments added in response to detection of insertion messages. The method 300b may be performed by the stream processing device 106 of FIG. 1. The flow begins at block 301b and proceeds to block 302b where the stream processing device receives a content stream utilizing the communication component 113 after insertion of one or more additional content segments. The flow then proceeds to block 303b where the processing unit 111 processes the content stream and the flow proceeds to block 304b. At block 304b, the processing unit 111 determines whether or not a signal is received from the reader device 105 indicating detection of an insertion message. If so, the flow proceeds to block 307b. Otherwise, the flow proceeds to block 305b.

At block 305b, the processing unit 111 determines whether or not the content stream is finished. If not, the flow returns to block 303b where the processing unit 111 continues to process the content stream. Otherwise, the flow proceeds to block 306b and ends.

At block 307b, after the processing unit determines that a signal is received from the reader device 105, the processing unit 111 inserts an interactive trigger in the content stream. The flow then proceeds to block 305a and the processing unit 111 determines whether or not the content stream is finished.

Figure 3C:
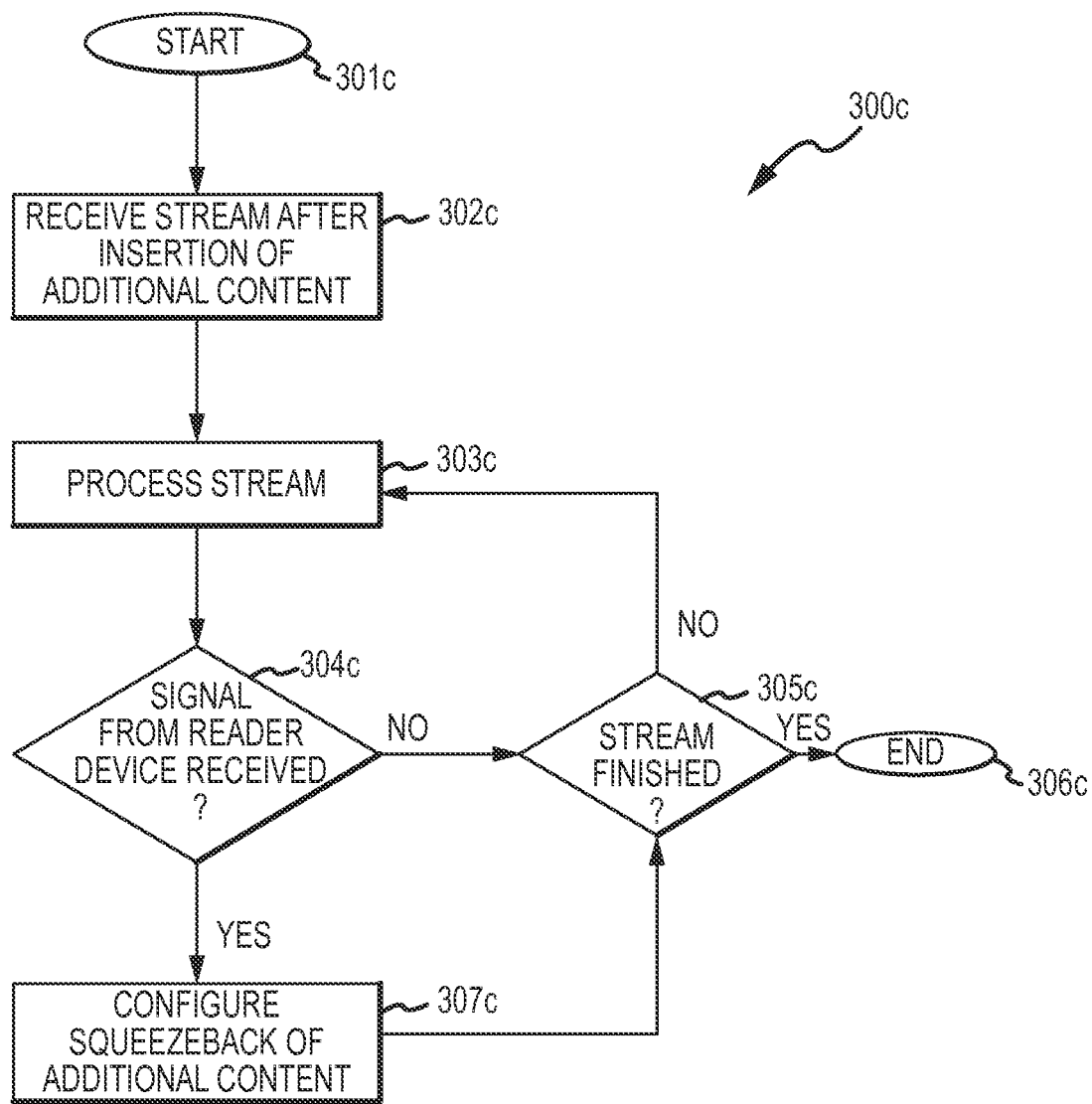
FIG. 3C is a flow chart illustrating a fourth example method for processing content streams that include additional content segments added in response to detection of insertion messages. This method may be performed by the stream processing device of FIG. 1.

FIG. 3C illustrates a fourth example method 300c for processing content streams that include additional content segments added in response to detection of insertion messages. The method 300c may be performed by the stream processing device 106 of FIG. 1. The flow begins at block 301c and proceeds to block 302c where the stream processing device receives a content stream utilizing the communication component 113 after insertion of one or more additional content segments. The flow then proceeds to block 303c where the processing unit 111 processes the content stream and the flow proceeds to block 304c. At block 304c, the processing unit 111 determines whether or not a signal is received from the reader device 105 indicating detection of an insertion message. If so, the flow proceeds to block 307c. Otherwise, the flow proceeds to block 305c.

At block 305c, the processing unit 111 determines whether or not the content stream is finished. If not, the flow returns to block 303c where the processing unit 111 continues to process the content stream. Otherwise, the flow proceeds to block 306c and ends.

At block 307c, after the processing unit determines that a signal is received from the reader device 105, the processing unit 111 configures a squeeze back of an additional content segment which corresponds to the detected insertion message that has been added to the content stream. The squeeze back may be a video processing effect that configures the additional content segment to be reduced in size when displayed so that a portion of the original source stream that corresponds to where the additional content segment is inserted is still displayed. The flow then proceeds to block 305c and the processing unit 111 determines whether or not the content stream is finished.

Figure 3D:
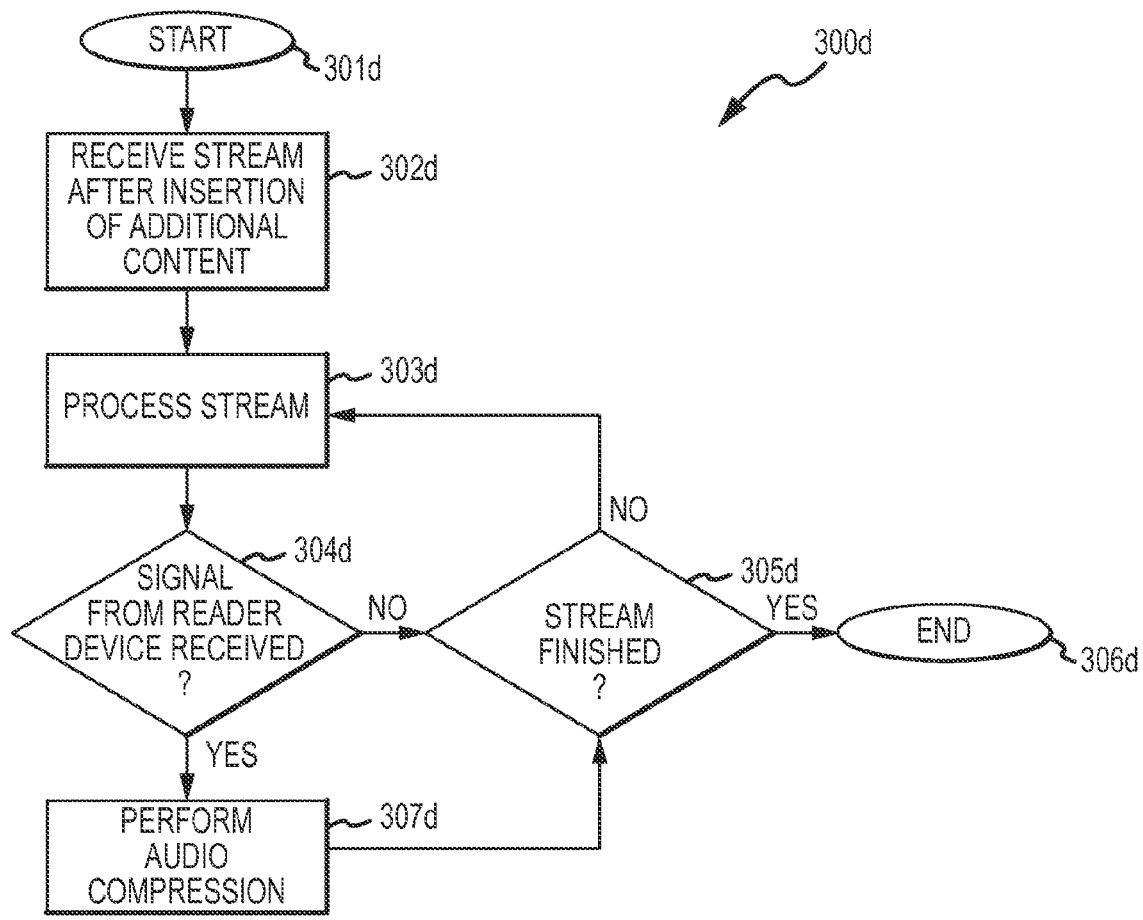
FIG. 3D is a flow chart illustrating a fifth example method for processing content streams that include additional content segments added in response to detection of insertion messages. This method may be performed by the stream processing device of FIG. 1.
Figure 3E:
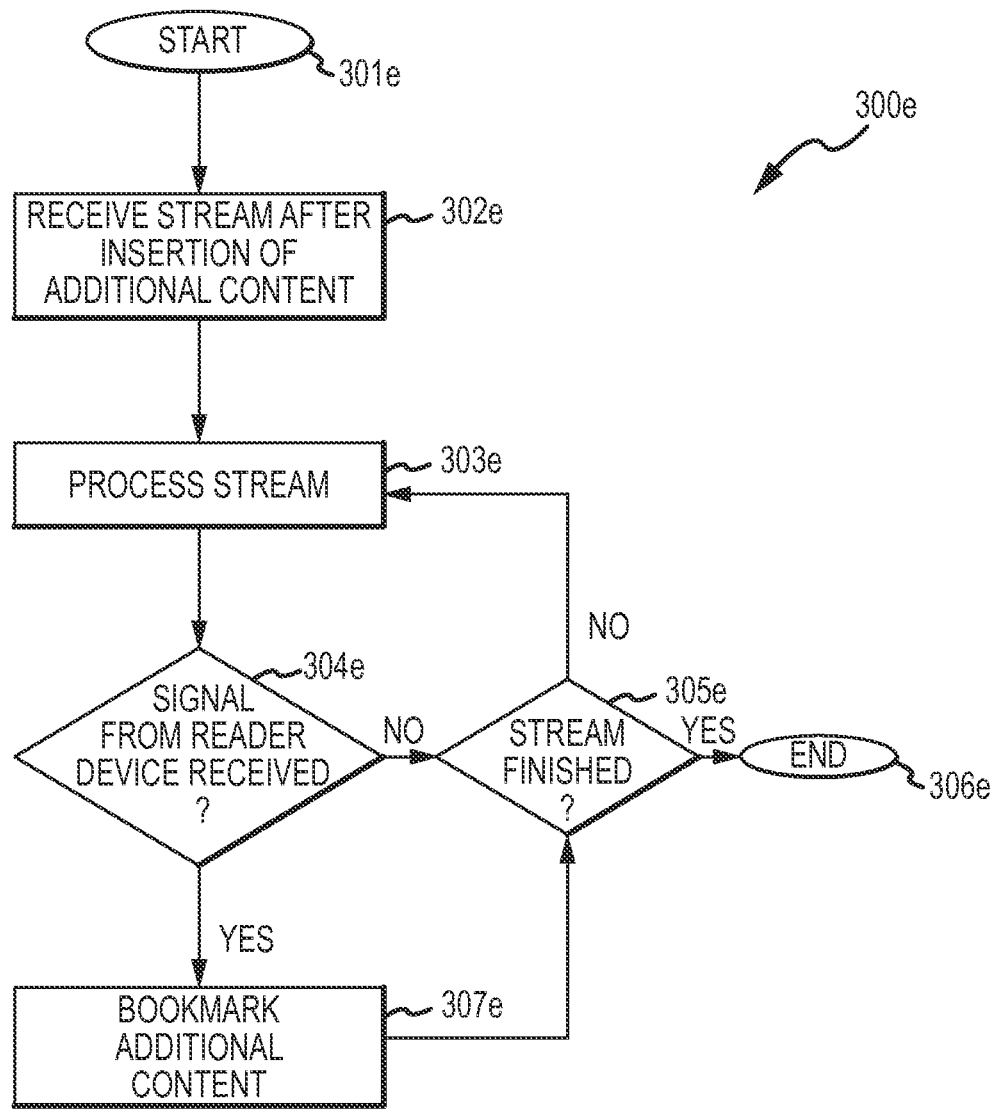
FIG. 3E is a flow chart illustrating a sixth example method for processing content streams that include additional content segments added in response to detection of insertion messages. This method may be performed by the stream processing device of FIG. 1.

FIG. 3D illustrates a fifth example method 300d for processing content streams that include additional content segments added in response to detection of insertion messages. The method 300d may be performed by the stream processing device 106 of FIG. 1. The flow begins at block 301d and proceeds to block 302d where the stream processing device receives a content stream utilizing the communication component 113 after insertion of one or more additional content segments. The flow then proceeds to block 303d where the processing unit 111 processes the content stream and the flow proceeds to block 304d. At block 304d, the processing unit 111 determines whether or not a signal is received from the reader device 105 indicating detection of an insertion message. If so, the flow proceeds to block 307d. Otherwise, the flow proceeds to block 305d.

At block 305d, the processing unit 111 determines whether or not the content stream is finished. If not, the flow returns to block 303d where the processing unit 111 continues to process the content stream. Otherwise, the flow proceeds to block 306d and ends.

At block 307d, after the processing unit determines that a signal is received from the reader device 105, the processing unit 111 performs audio compression on an additional content segment that corresponds to the detected insertion message. Such audio compression may include correcting audio quality of the additional content segment, reducing audio levels of the additional content segment, and/or any other audio compression operation. The flow then proceeds to block 305d and the processing unit 111 determines whether or not the content stream is finished.

FIG. 3D illustrates a sixth example method 300e for processing content streams that include additional content segments added in response to detection of insertion messages. The method 300e may be performed by the stream processing device 106 of FIG. 1. The flow begins at block 301e and proceeds to block 302e where the stream processing device receives a content stream utilizing the communication component 113 after insertion of one or more additional content segments. The flow then proceeds to block 303e where the processing unit 111 processes the content stream and the flow proceeds to block 304e. At block 304e, the processing unit 111 determines whether or not a signal is received from the reader device 105 indicating detection of an insertion message. If so, the flow proceeds to block 307e. Otherwise, the flow proceeds to block 305e.

At block 305e, the processing unit 111 determines whether or not the content stream is finished. If not, the flow returns to block 303e where the processing unit 111 continues to process the content stream. Otherwise, the flow proceeds to block 306e and ends.

At block 307e, after the processing unit determines that a signal is received from the reader device 105, the processing unit 111 inserts one or more bookmarks to mark the additional content segment. The additional content segment may be a commercial and the bookmark may enable a content receiver (such as the content receivers 104a-104n) that receives the content stream to skip the commercial when presenting the content stream. The flow then proceeds to block 305e and the processing unit 111 determines whether or not the content stream is finished.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for processing content streams that include additional content segments added in response to detection of insertion messages, the method comprising:
   receiving a source stream at a content provider;
   processing the source stream at the content provider to incorporate an additional content segment into the source stream at a location identified by an insertion message in the source stream to generate a content stream
   monitoring the content stream utilizing a reading device;
   detecting, utilizing the reading device, the insertion message in the content stream associated with the additional content segment incorporated into the source stream; and
   signaling a stream processing device utilizing the reading device to perform an operation on a portion of the content stream that includes the additional content segment based at least on the detected insertion message, wherein the operation comprises configuring the portion of the content stream to implement a squeeze back effect based at least on the signaling.

2. The method of claim 1, wherein the reading device is incorporated into the stream processing device.

3. The method of claim 1, wherein the reading device is connected to the stream processing device utilizing a contact closure.

4. The method of claim 3, wherein the operation of signaling the stream processing device utilizing the reading device to perform the operation on the portion of the content stream that includes the additional content segment based at least on the detected insertion message further comprises:
   activating the contact closure based at least on the detected insertion message.

5. The method of claim 1, further comprising:
   transmitting the content stream from the stream processing device to a content receiver via a transmission system.

6. The method of claim 1, wherein the insertion message includes an indication of a start of the portion of the source stream and an indication of a duration of the portion of the source stream.

7. The method of claim 6, wherein the indication of the start of the portion of the source stream comprises a countdown until the start of the portion of the source stream.

8. The method of claim 1, wherein the insertion message comprises at least one of:
   a SCTE 104 message,
   a SCTE 35 message, or
   a SCTE 30 message.

9. The method of claim 1, wherein the additional content segment comprises a commercial.

10. A system for processing content streams that include additional content segments added in response to detection of insertion messages, comprising:
a reader device, comprising:
a communication component that receives a content stream that comprises a source stream received from a content source that has been modified by adding an additional content segment to a portion of the source stream in response to detection of an insertion message included in the source stream;
a signaling component that is operable to signal a stream processing device; and
a processing unit that monitors the content stream and detects the insertion message in the content stream associated with the additional content segment that has been added into the source stream;
wherein the processing unit signals the stream processing device based at least on the detected insertion message utilizing the signaling component to perform an operation on a portion of the content stream that includes the additional content segment; and
wherein the operation comprises performing audio quality correction or audio level reduction on the portion of the content stream.

11. The system of claim 10, further comprising:
a transmission system that transmits the content stream from the stream processing device to a content receiver.

12. The system of claim 10, further comprising:
the stream processing device.

13. The system of claim 10, wherein the signaling component comprises a contact closure connected to the stream processing device.

14. The system of claim 13, wherein the processing unit signals the stream processing device by activating the contact closure based at least on the detected insertion message.

15. The system of claim 10, wherein the reading device is incorporated into the stream processing device.

16. The system of claim 10, wherein the additional content segment comprises a commercial.

17. The system of claim 10, wherein the insertion message comprises at least one of:
a SCTE 104 message,
a SCTE 35 message, or
a SCTE 30 message.

18. The system of claim 10, wherein the insertion message includes a countdown until a start of the portion of the source stream and an indication of a duration of the portion of the source stream.

19. A method for processing content streams that include additional content segments added in response to detection of insertion messages, the method comprising:
monitoring a content stream, utilizing a reading device, that comprises a source stream received from a content source that is modified by adding an additional content segment to a portion of the source stream in response to detection of an insertion message included in the source stream;
detecting, utilizing the reading device, the insertion message in the content stream; and
signaling a stream processing device utilizing the reading device to perform an operation on a portion of the content stream that includes the additional content segment based at least on the detected insertion message, wherein the operation comprises omitting insertion of a periodic interactive trigger that the stream processing device periodically inserts into the content stream in the portion of the content stream based at least on said signaling.

20. A system for processing content streams that include additional content segments added in response to detection of insertion messages, comprising:
a reader device, comprising:
a communication component that receives a content stream that comprises a source stream received from a content source that has previously been modified by adding an additional content segment to a portion of the source stream in response to detection of an insertion message included in the source stream;
a signaling component that is operable to signal a stream processing device; and
a processing unit that monitors the content stream and detects the insertion message in the content stream associated with the additional content segment that has previously been added into the source stream;
wherein the processing unit signals the stream processing device based at least on the detected insertion message utilizing the signaling component to perform an operation on a portion of the content stream that includes the additional content segment; and
wherein the operation comprises inserting a viewer interactive trigger in the portion of the content stream that includes the additional content segment based at least on the signaling.

21. The system of claim 20, wherein the viewer interactive trigger comprises a viewer interactive pop-up menu.

\* \* \* \* \*